(12) United States Patent
Wong

(10) Patent No.: US 6,351,138 B1
(45) Date of Patent: Feb. 26, 2002

(54) ZERO-DC-POWER ACTIVE TERMINATION WITH CMOS OVERSHOOT AND UNDERSHOOT CLAMPS

(75) Inventor: Anthony Yap Wong, Cupertino, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 0 days.

(21) Appl. No.: 09/681,344

(22) Filed: Mar. 22, 2001

(51) Int. Cl.[7] ............................................... H03K 17/16
(52) U.S. Cl. ........................................... 326/30; 326/86
(58) Field of Search .............................. 326/30, 83, 86, 326/89, 90

(56) References Cited

U.S. PATENT DOCUMENTS

| | | | | |
|---|---|---|---|---|
| 4,450,370 A | | 5/1984 | Davis .......................... 307/475 |
| 4,748,426 A | | 5/1988 | Stewart ....................... 333/222 |
| 5,020,102 A | | 5/1991 | Schorr ......................... 379/399 |
| 5,166,561 A | | 11/1992 | Okura ......................... 307/549 |
| 5,214,320 A | | 5/1993 | Troung ........................ 307/443 |
| 5,329,190 A | * | 7/1994 | Igarashi et al. ............... 326/30 |
| 5,528,190 A | | 6/1996 | Honniford ................... 327/328 |
| 5,530,377 A | | 6/1996 | Walls .......................... 326/30 |
| 5,602,494 A | * | 2/1997 | Sundtrom ..................... 326/30 |
| 5,635,852 A | * | 6/1997 | Wallace ........................ 326/30 |
| 5,652,528 A | | 7/1997 | Kimura et al. ................ 326/83 |
| 6,051,989 A | | 4/2000 | Walck .......................... 326/30 |
| RE36,789 E | | 7/2000 | Mandel et al. ................ 326/30 |
| 6,100,713 A | | 8/2000 | Kalb et al. .................... 326/30 |
| 6,163,165 A | | 12/2000 | Starr ............................ 326/30 |
| 6,163,178 A | | 12/2000 | Stark et al. ................. 327/108 |
| 6,184,730 B1 | | 2/2001 | Kwong et al. .............. 327/112 |

* cited by examiner

Primary Examiner—Michael Tokar
Assistant Examiner—Don Phu Le
(74) Attorney, Agent, or Firm—Stuart T. Auvinen

(57) ABSTRACT

An active terminating circuit has n-channel and p-channel sensing transistors with gates connected to a transmission line. The sensing transistors drive a back node connected to a pair of capacitors. One capacitor drives a p-gate node coupled to a gate of a p-channel clamping transistor, while the other capacitor drives an n-gate node coupled to a gate of an n-channel clamping transistor. The drains of the clamping transistors are connected to the transmission line. Resistors pull the p-gate node to the power-supply voltage and pull the n-gate node to ground when no transitions occur on the transmission line to achieve zero standby power. When a transition is detected, it is inverted and coupled through the capacitors to the p-gate and n-gate nodes. The p-channel clamping transistor is turned on for rising transitions, while the n-channel clamping transistor is turned on for falling transitions. Limiting transistors limit gate-node swings.

20 Claims, 6 Drawing Sheets

ZERO-DC-POWER ACTIVE TERMINATION WITH CMOS OVERSHOOT AND UNDERSHOOT CLAMPS

BACKGROUND OF THE INVENTION

This invention relates to transmission lines, and more particularly to active terminators for transmission lines.

Cables and longer wiring traces on printed-circuit boards (PCBs) can act as transmission lines. Such lines are treated as transmission lines when the time for a signal to travel from one end to the other end of the line is equal to or more than half of the signal transition (rise or fall) time. High-performance integrated circuits can decrease rise and fall times, while PCB traces remain roughly constant. Thus more signal lines have to be treated as transmission lines in more advanced systems.

Impedance mismatches between the transmission line and its loads cause reflections. Reflection are signals that travel along the transmission line, back and forth between the driver and a receiver, causing unwanted signal ringing, overshoot, undershoot, and noise. The quality of signals is degraded.

Various techniques are used to minimize reflection and ringing. Terminating resistors, resistor-capacitors, and diodes can be added to the transmission line to match line impedances or clamp the undershoots and overshoots of ringing. Active terminators have also been used.

FIG. 1 is a diagram of a prior-art active terminator for a transmission line. P-channel transistor 12 and n-channel transistor 14 have their drains connected to a transmission line. Transistors 12, 14 are biased on so that they can actively terminate the transmission line.

The desired gate biases for transistors 12, 14 is generated by current-mirror transistors 16, 18, which each have their drains coupled to their gates. A continuous D.C. current 11 is generated by a current source, causing current to flow through current-mirror transistors 16, 18 from power to ground. The p-channel gate node from current-mirror transistor 16 is coupled to the gate of p-channel transistor 12. This p-gate node is biased to about one transistor threshold of p-channel transistor 16 below the power-supply voltage. P-channel transistor 12 is biased in the linear region and has a relatively low drain current compared to a similar transistor biased by a larger gate-to-source voltage in the saturated region.

Likewise, n-channel transistor 14 has its gate biased to about one n-channel transistor threshold above ground by n-channel current-mirror transistor 18. Since the n-channel threshold is about 0.6 volt, n-channel transistor 14 clamps the transmission line to about −500 mV. When the transmission-line voltage drops below ground to −0.5 volt or beyond, n-channel transistor 14 turns on more strongly in the saturated region, clamping the undershoot. Transistors 12, 14 need to be rather large in area to provide a sufficient clamping current despite being biased in the linear region.

The constant current through transistors 16, 18 is undesirable, since many complementary metal-oxide-semiconductor (CMOS) digital circuits are zero standby power devices. Stability at the gate node is also a problem, since transitions on the transmission line can be coupled to the gate nodes through the drain-to-gate parasitic capacitances of transistors 12, 14. The drain current of transistors 12, 14 can be reduced by the noise coupled into the gate nodes, reducing the effectiveness of the active clamp.

What is desired is a zero-standby-power active termination circuit for a transmission line. A lower-power terminator is desired using CMOS transistors.

DETAILED DESCRIPTION

The present invention relates to an improvement in active termination circuits. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 2:
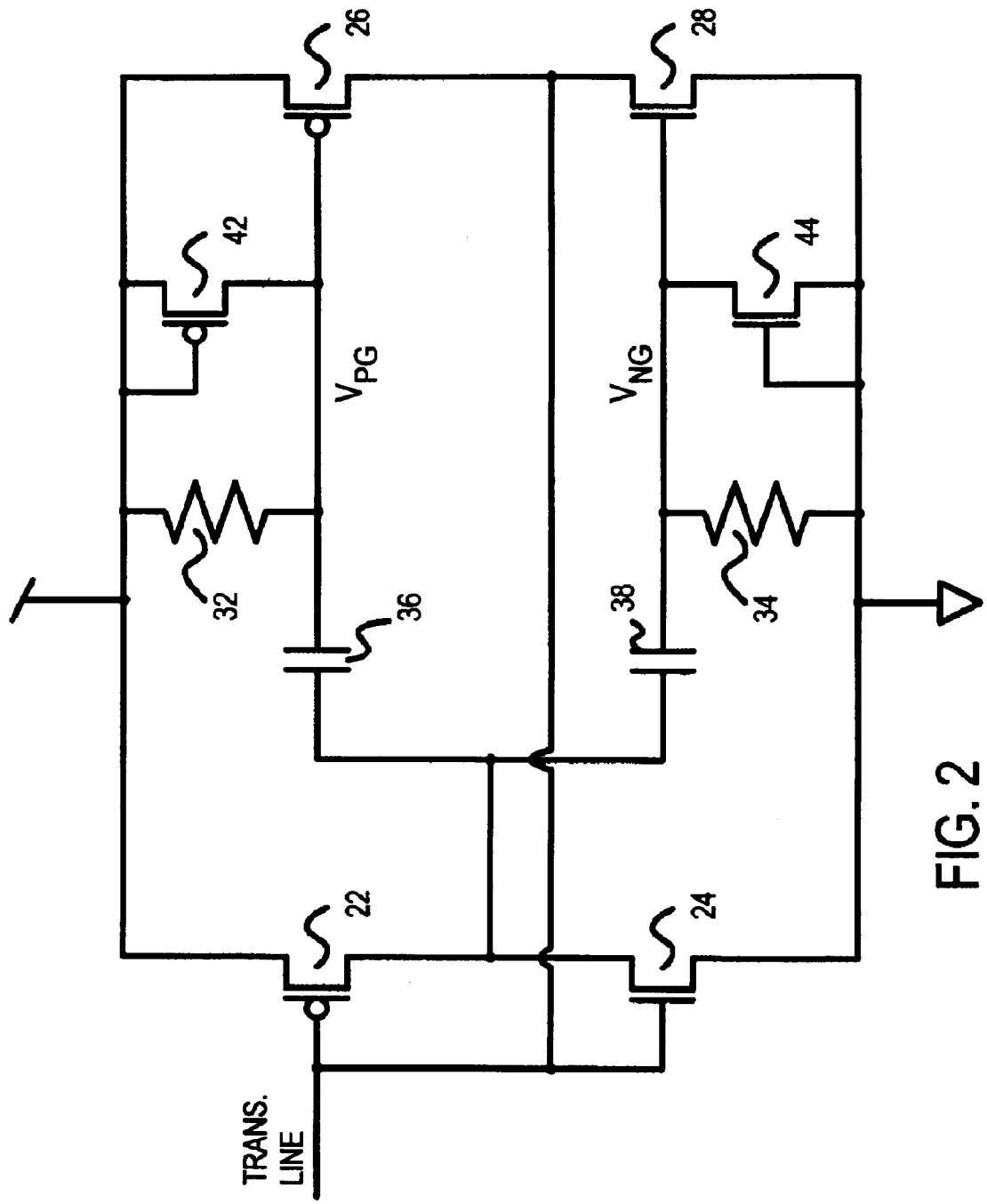
FIG. 2 is a diagram of a zero DC-power active termination circuit.

FIG. 2 is a diagram of a zero DC-power active termination circuit. A transmission line is coupled to the drains of clamping transistors 26, 28 and to the gates of sensing transistors 22, 24. When no transition is sensed on the transmission line, pullup resistor 32 pulls p-gate node VPG high to the power-supply voltage, while pull-down resistor 34 pulls n-gate node VNG down to ground. Since VNG is at ground, the gate of n-channel clamping transistor 28 is at ground, keeping it off. Likewise, p-channel clamping transistor 26 is kept off by node VPG which is at Vcc. Thus at steady state, no current is consumed by clamping transistors 26, 28.

Sensing transistors 22, 24 invert the state of the transmission line and drive node VPG through capacitor 36, and node VNG through capacitor 38. When the transmission line transitions from low to high, n-channel sensing transistor 24 turns on, driving the left plates of capacitors 36, 38 low. Some of this low-going voltage transition is coupled through capacitors 36, 38 to nodes VPG, VNG, so that these nodes drop in voltage somewhat.

Ideally, when the outputs of sensing transistors 22, 24 drops from Vcc to ground, nodes NPG, VNG also drop by Vcc. However, the actual voltage drop coupled by capacitors 36, 38 into nodes VPG, VNG depends on the coupling ratio, the ratio of the capacitance of capacitors 36, 38 to the total capacitances on nodes VPG, VNG. For a 3-volt Vcc, when capacitors 36, 38 are large and resistors 32, 34 are small, as much as 2 or 2.5 volts can be coupled into nodes VPG, VNG.

The high-going transition on the transmission line produces a dip in the voltage of node VPG from Vcc down to about 1.3 volts. Node VNG also dips from ground to about −1.0 volt, but is clamped by n-channel limiting transistor 44, which has its gate coupled to ground. N-channel limiting transistor 44 is normally off, but turns on as node VNG drops more than a threshold below ground.

N-channel clamping transistor 28 remains off, but p-channel clamping transistor 26 is turned on by the drop in voltage VPG. P-channel clamping transistor 26 first turns on as node VPG drops a threshold below power, or Vcc-|Vtn|. As node VPG continues to drop, a larger gate-to-source voltage drive is produced, turning p-channel clamping transistor 26 on more strongly. A large clamping current is provided due to the large gate-to-source voltage.

Pullup resistor 32 gradually pulls node VPG back up to Vcc. As the voltage on node VPG rises to within a threshold of Vcc, p-channel clamping transistor 26 turns off. Pullup resistor eventually pulls node VPG to Vcc. Pulldown resistor 34 also pulls node VNG back to ground.

When the transmission line transitions from high to low, sensing p-channel transistor 22 turns on, quickly driving the left sides of capacitors 36, 38 from ground to Vcc. This sudden voltage change is partially coupled to nodes VPG, VNG, which suddenly rise in voltage. Node VPG is pulled from Vcc to about 4.4 volts, but is clamped by p-channel limiting transistor 42, which has its gate coupled to Vcc and turns on as node VPG, its source, rises more than a threshold above Vcc.

Node VNG is driven from ground to about 2 volts by capacitive coupling from capacitor 38. As node VNG rises past a threshold above ground, n-channel clamping transistor 28 turns on. As the voltage on node VNG rises still further above threshold, the gate-to-source voltage across n-channel clamping transistor 28 is increased, increasing the drain current available to clamp the transmission line. Since node VNG rises to 2 volts, a large gate drive is provided to n-channel clamping transistor 28, producing a large clamping current.

Eventually, pull-down resistor 34 pulls node VNG back down to ground. Clamping transistor 28 turns off as node VNG falls below the n-channel threshold voltage of about 0.5 volt.

Figure 3:
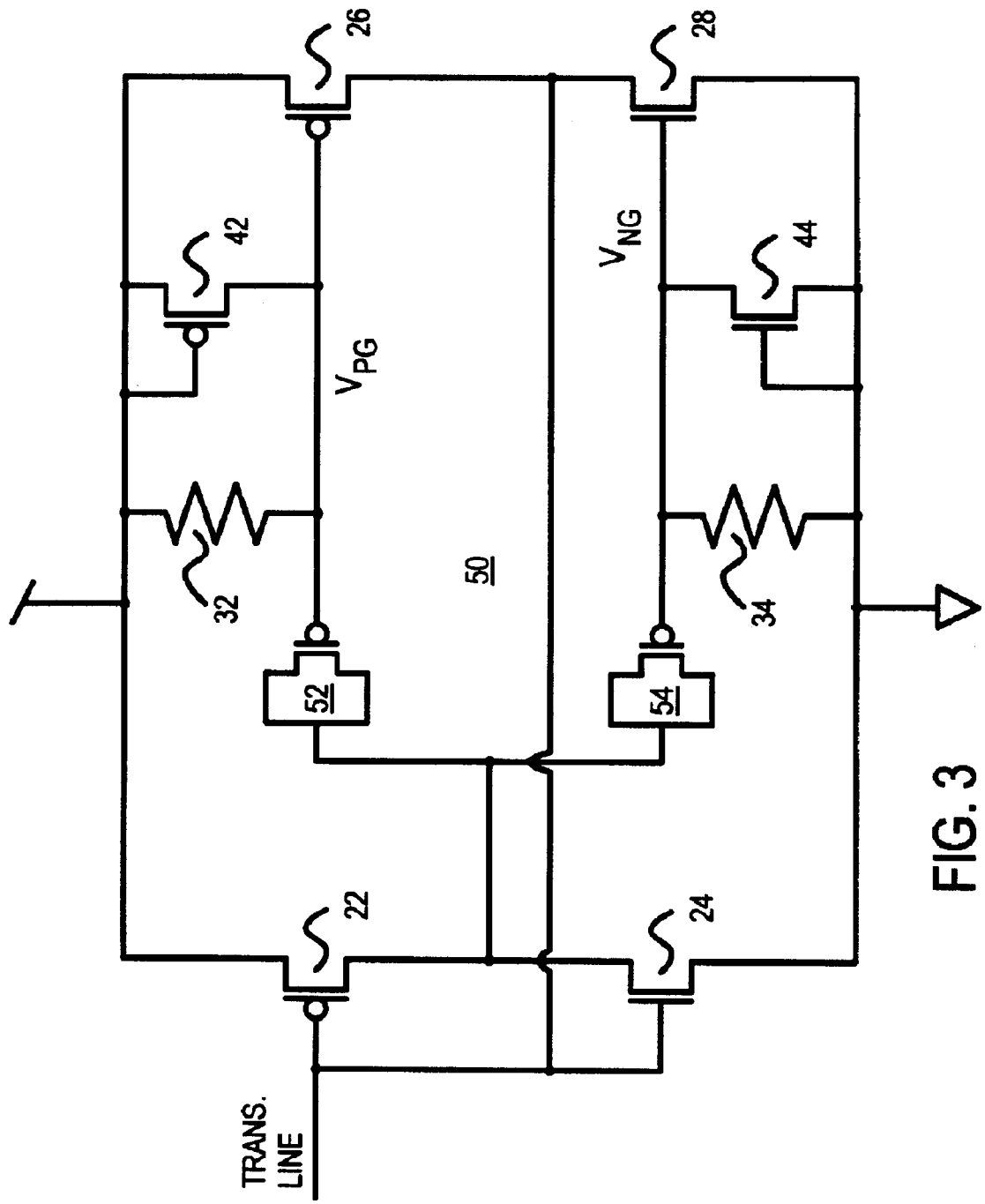
FIG. 3 is an alternate embodiment using p-channel transistors as coupling capacitors.

FIG. 3 is an alternate embodiment using p-channel transistors as coupling capacitors. P-channel transistor 52 acts as a coupling capacitor from the output of sensing transistors 22, 24 to node VPG, replacing capacitor 36 of FIG. 2. P-channel transistor 54 acts as a coupling capacitor from the output of sensing transistors 22, 24 to node VNG, replacing capacitor 38 of FIG. 2. Operation of active terminating circuit 50 is similar to that described earlier for FIG. 2. The sources, drains, and N-well of p-channel transistors 52, 54 are preferably coupled to the output of sensing transistors 22, 24, allowing their gates to be coupled to nodes VPG, VNG. This reduces the parasitic capacitances on nodes VPG, VNG, and minimizes the transistor area by using a common N-well for transistors 52 and 54.

Figure 1:
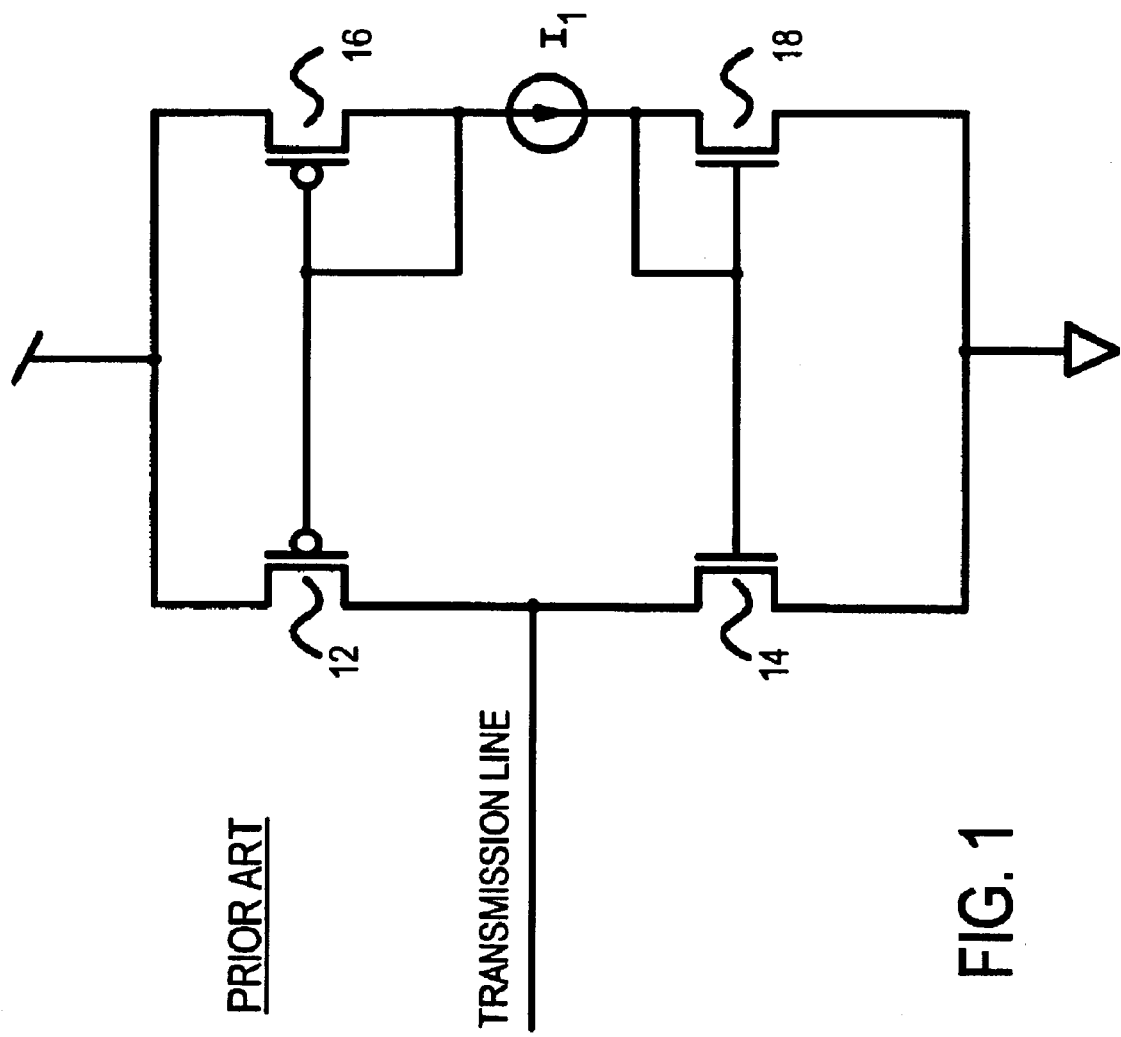
FIG. 1 is a diagram of a prior-art active terminator for a transmission line.

The sizes of clamping transistors 26, 28 can be much smaller than the sizes of transistors 12, 14 of FIG. 1. Since clamping transistors 26, 28 are actively biased to about 1.5 volt beyond threshold, they are biased fully into the saturated region, while transistors 12, 14 are biased weakly near threshold in the linear region. Thus a smaller W/L is needed for a desired clamping (drain) current.

Figure 4:
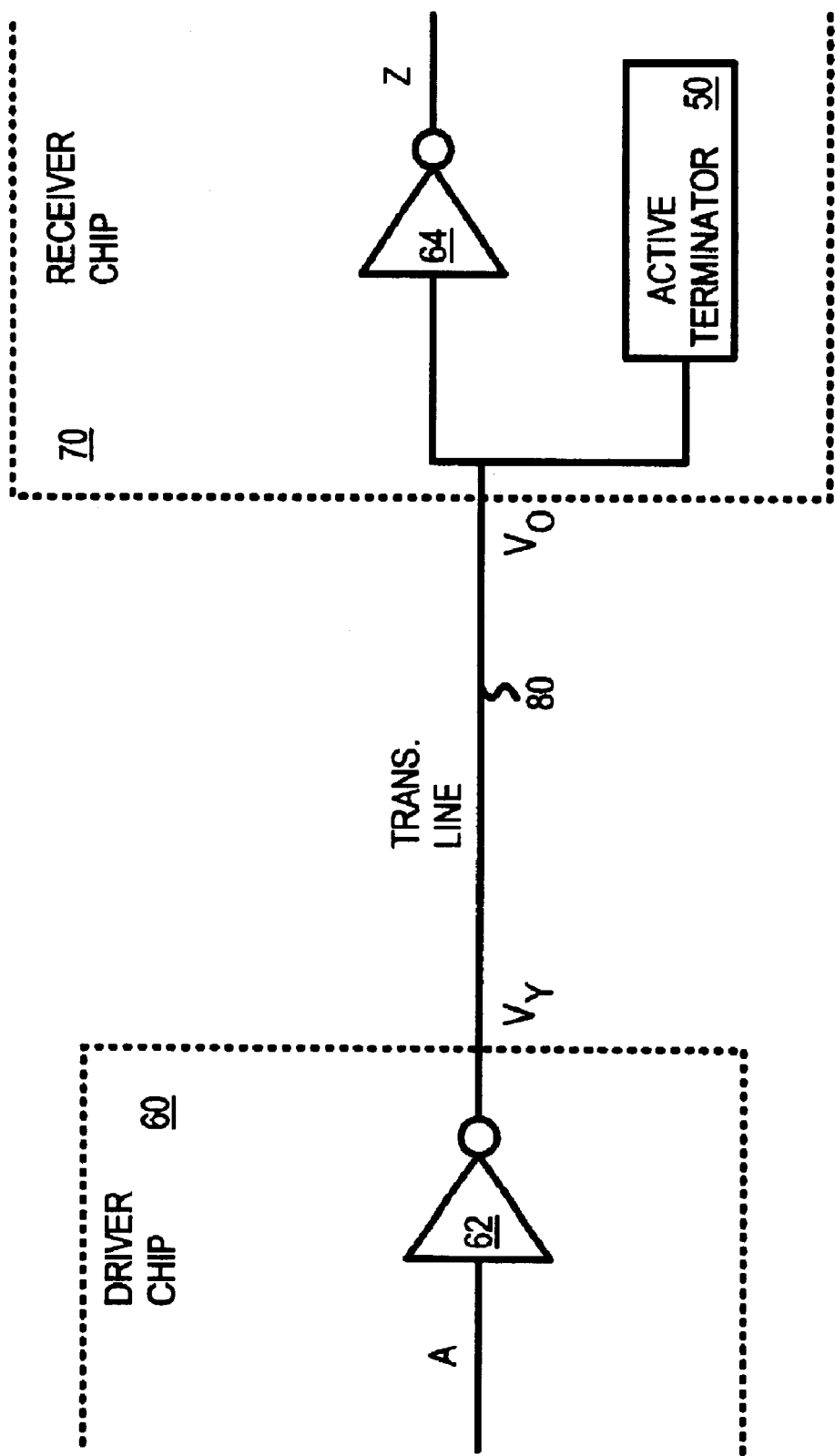
FIG. 4 shows an application of the active terminator on a receiver end of a transmission line.

FIG. 4 shows an application of the active terminator on a receiver end of a transmission line. Driver chip 60 includes buffer 62, which drives external transmission line 80. When internal signal A changes, the end of transmission line 80 connected to driver chip 60 is immediately driven high or low. Thus voltage Vy changes quickly. Signal quality at Vy depends on the signal reflection in transmission line 80.

The far end of transmission line 80 is coupled to receiver chip 70. Receiver chip 70 includes input buffer 64 which receives transmission line 80 and senses voltage changes on transmission line 80, to driver internal signal Z. Due to transmission line 80 with distributed capacitances, inductances and resistances along the line, when buffer 62 drives transmission line 80, a delay occurs from the output signal of driver chip 60, voltage Vy, to voltage Vo at the far end near receiver chip 70. Signal quality degrades near receiver chip 70, so that overshoot, undershoot and ringing are seen at Vy and Vo.

Active terminating circuit 50 also connects to the far end of transmission line 80. Active terminating circuit 50 can be integrated onto receiver chip 70, and a single I/O pin on chip 70 can connect to transmission line 80. Both input buffer 64 and active terminating circuit 50 are connected to the transmission-line I/O pin using internal wiring traces.

Active terminating circuit 50 senses transitions on transmission line 80. When an edge transition is detected, a clamping transistor in active terminating circuit 50 is activated to sink or source a large current, effectively clamping any undershoot or overshoot on transmission line 80. A low impedance is presented to transmission line 80 by the activated clamping transistor in active terminating circuit 50 immediately after the edge is detected. After a period of time determined by the pull-up or pull-down resistor, the clamping transistor is turned off again, reducing the clamped current drawn by active terminating circuit 50 to near zero.

The signal quality at both ends of transmission line 80 is improved by active terminating circuit 50 since overshoots and undershoots are absorbed quickly. This minimizes ringing seen on both ends of transmission line 80. Also, signal quality at both Vo and Vy ends is improved significantly due to less reflection of signals on transmission line 80.

Figure 5:
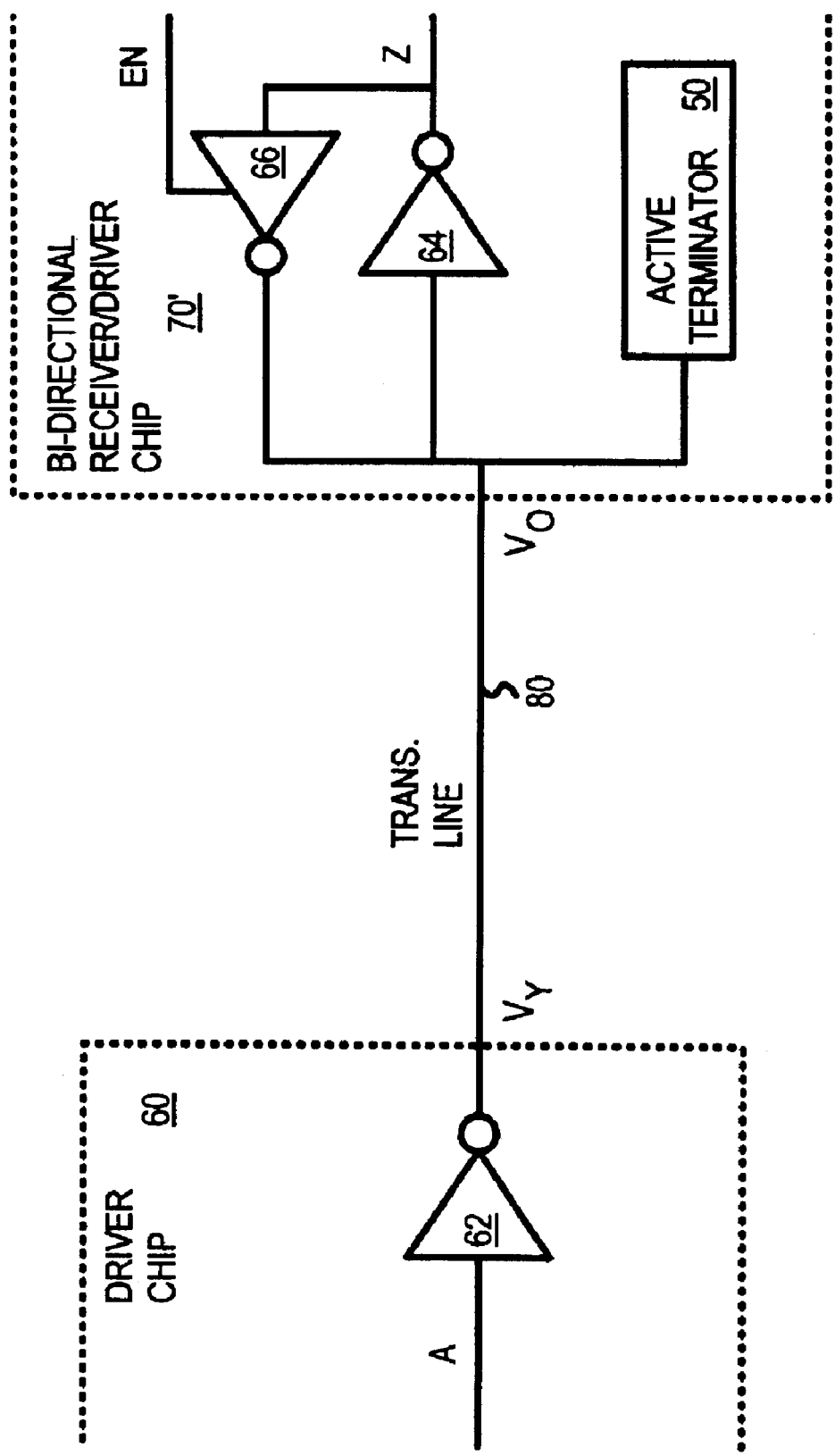
FIG. 5 shows an application of the active terminator on a bi-directional transceiver end of a transmission line.

FIG. 5 shows an application of the active terminator on a bi-directional transceiver end of a transmission line. Transceiver chip 70' includes input buffer 64 and output buffer 66. When transceiver chip 70' drives transmission line 80, the internal enable signal EN activates output buffer 66. Input buffer 64 can be disabled.

Active terminating circuit 50 can be disabled by internal enable signal EN, or can be left enabled when output buffer 66 drives transmission line 80. Active terminating circuit 50 activates only one of the clamping transistors at a time. The p-channel clamping transistor is activated by a high-going transition, when output buffer 66 also has its p-channel pull-up driver transistor activated. Likewise, the n-channel clamping transistor is activated by a low-going transition, when output buffer 66 also has its n-channel pull-down driver transistor activated. After a short period of time, the clamping transistors are turned off in active terminating circuit 50. Thus active terminating circuit 50 does not fight against output buffer 66 and does not degrade signal quality.

Active terminating circuit 50 simply acts to prevent any undershoots or overshoots on transmission line 80 when output buffer 66 is driving the transmission line and driver chip 60 is disabled. Other receiver chips may connect to transmission line 80, such as when transmission line 80 is a bus.

Figure 6:
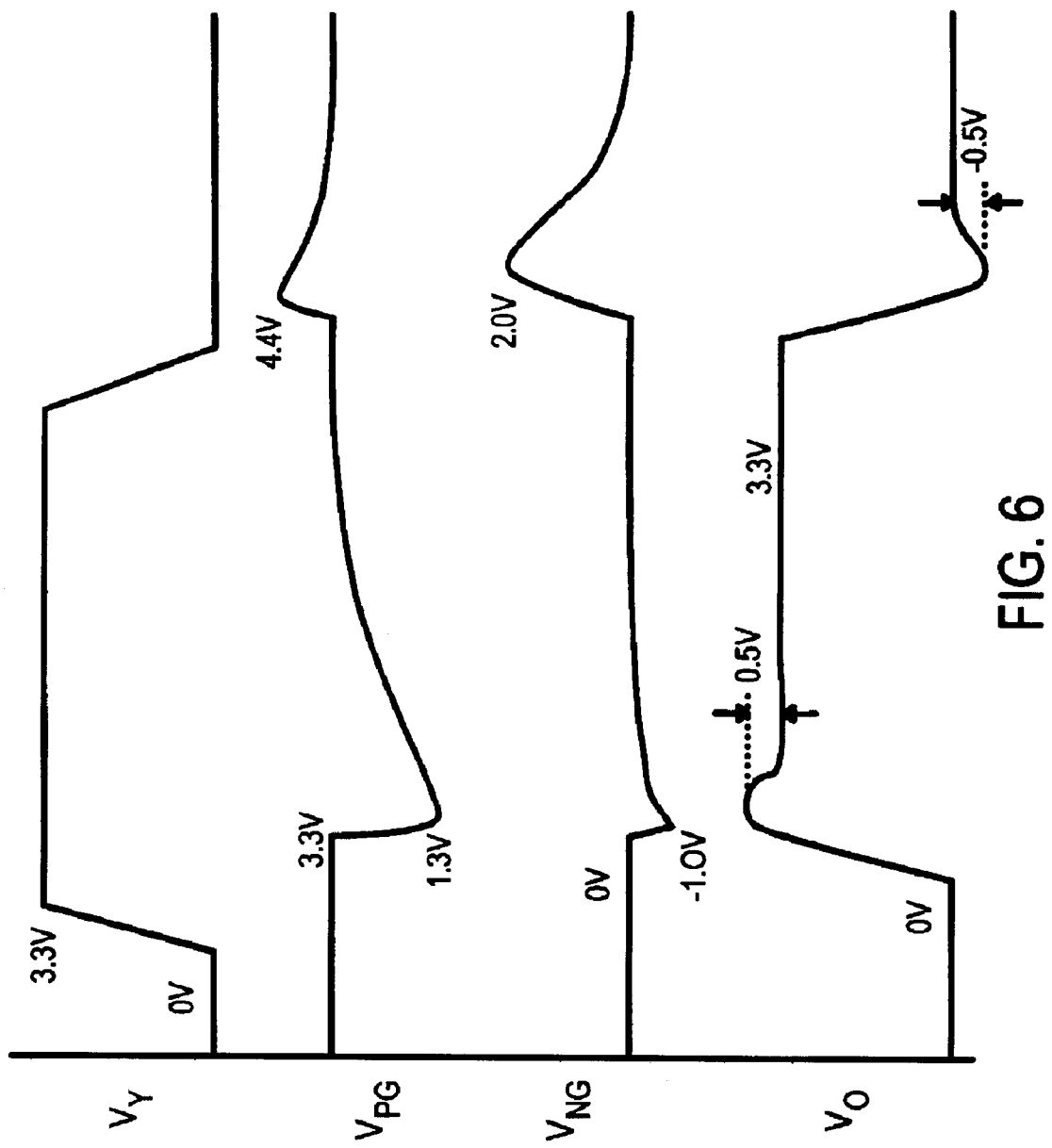
FIG. 6 shows waveforms of the active termination circuit.

FIG. 6 shows waveforms of the active termination circuit. When the termination line is driven high, the driver-side voltage Vy immediately responds. This rising voltage is sensed by the sensing transistors of the active termination circuit, which invert the transition. The inverted transition is coupled by the coupling capacitors into gate nodes VPG, VNG. The p-gate node VPG drops about 2 volts from Vcc (3.3 volts in this example) to 1.3 volt before slowly rising back to Vcc. The p-channel clamping transistor is turned on by the drop in VPG, providing a clamping current that clamps the overshoot to about 0.5 volt above Vcc, as seen at the far end of the transmission line, voltage Vo. The far end of the transmission line is coupled to the active termination circuit.

The n-gate node VNG also falls, but is clamped to about a volt below ground by the n-channel limiting transistor. Of course, the actual voltage drop depends on the size of the limiting transistor, the size of the coupling capacitor, and the other capacitances and resistances of the circuit, as well as the transition time of the driver.

When the termination line is driven low, the driver-side voltage Vy immediately responds with a sharp low-going transition. This falling voltage is sensed by the sensing transistors of the active termination circuit, which invert the transition. The inverted transition is coupled by the coupling capacitors into gate nodes VPG, VNG. The n-gate node VNG rises about 2 volts from ground before slowly falling back to ground. The n-channel clamping transistor is turned on by the rise in VNG, providing a clamping current that clamps the undershoot to about 0.5 volt below ground, as seen at the far end of the transmission line, voltage Vo. The p-gate node VPG also rises in voltage, but is limited to about 1.1 volt above Vcc by the p-channel limiting transistor.

ALTERNATE EMBODIMENTS

Several other embodiments are contemplated by the inventor. For example, additional components can be added to the active terminating circuit. Larger clamping transistors can be used to reduce the effective clamping voltage, or to maintain a desired clamp voltage when larger currents are driven onto the transmission line. An enable can be added to the active terminating circuit.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An active terminating circuit comprising:
   a transmission line input for coupling to a transmission line;
   a sensing device, having a gate coupled to the transmission line input, for driving a back node;
   a first capacitor, coupled between the back node and a p-gate node;
   a p-channel clamping transistor, having a gate coupled to the p-gate node, for driving the transmission line with a first clamping current when activated by the sensing device;
   a pullup device, coupled between the p-gate node and a power-supply voltage, for biasing the p-gate node to the power-supply voltage;
   a second capacitor, coupled between the back node and an n-gate node;
   an n-channel clamping transistor, having a gate coupled to the n-gate node, for driving the transmission line with a second clamping current when activated by the sensing device; and
   a pulldown device, coupled between the n-gate node and a ground voltage, for biasing the n-gate node to the ground voltage,
   whereby the sensing device activates the first or second clamping currents to actively terminate the transmission line.

2. The active terminating circuit of claim 1 wherein the sensing device comprises:
   a p-channel sensing transistor, having a gate coupled to the transmission line input and a drain coupled to the back node and a source coupled to the power-supply voltage;
   a n-channel sensing transistor, having a gate coupled to the transmission line input and a drain coupled to the back node and a source coupled to the ground voltage,
   whereby the sensing device inverts transitions on the transmission line to drive the back node.

3. The active terminating circuit of claim 2 wherein the pullup device comprises a first resistor between the p-gate node and the power-supply voltage;
   wherein the pulldown device comprises a second resistor between the n-gate node and the ground voltage,
   whereby the first and second resistor return the p-gate node to the power-supply voltage and the n-gate node to the ground voltage when no transitions on the transmission line are detected by the sensing device.

4. The active terminating circuit of claim 3 further comprising:
   a first limiting transistor, coupled between the p-gate node and the power-supply voltage, for limiting a voltage swing above the power-supply voltage coupled from the back node to the p-gate node by the first capacitor;
   a second limiting transistor, coupled between the n-gate node and the ground voltage, for limiting a voltage swing below the ground voltage coupled from the back node to the n-gate node by the second capacitor,
   whereby voltage swings of the p-gate and n-gate nodes are limited.

5. The active terminating circuit of claim 4 wherein the first limiting transistor comprises a p-channel transistor having a gate coupled to the power-supply voltage;
   wherein the second limiting transistor comprises an n-channel transistor having a gate coupled to the ground voltage.

6. The active terminating circuit of claim 5 wherein the p-channel clamping transistor has a drain coupled to the transmission line input and a source coupled to the power-supply voltage;
   wherein the n-channel clamping transistor has a drain coupled to the transmission line input and a source coupled to the ground voltage.

7. The active terminating circuit of claim 6 wherein the first capacitor is a p-channel transistor with a gate coupled to the p-gate node and a source and a drain and an N-well coupled together and to the back node.

8. The active terminating circuit of claim 7 wherein the second capacitor is a p-channel transistor with a gate coupled to the n-gate node and a source and a drain and an N-well coupled together and to the back node.

9. The active terminating circuit of claim 8 wherein the active terminating circuit is integrated onto an integrated circuit with an input buffer that also is coupled to the transmission line input.

10. The active terminating circuit of claim 9 wherein the active terminating circuit is integrated onto an integrated circuit with an output buffer that also is coupled to the transmission line input.

11. An active terminator comprising:

a first sensing transistor, having a gate coupled to a transmission line, a drain coupled to a back node, and a source coupled to a power supply;

a second sensing transistor, having a gate coupled to the transmission line, a drain coupled to the back node, and a source coupled to a ground;

a first capacitor, coupled between the back node and a p-gate node;

a pullup clamp transistor, having a gate coupled to the p-gate node, a drain coupled to the transmission line, and a source coupled to the power supply;

a pullup resistor, coupled between the p-gate node and the power supply;

a second capacitor, coupled between the back node and an n-gate node;

a pulldown clamp transistor, having a gate coupled to the n-gate node, a drain coupled to the transmission line, and a source coupled to the ground; and a pulldown resistor, coupled between the n-gate node and the ground.

12. The active terminator of claim 11 further comprising:

a first limiting transistor, having a gate coupled to the power supply, a drain coupled to the power supply, and a source coupled to the p-gate node;

a second limiting transistor, having a gate coupled to the ground, a drain coupled to the ground, and a source coupled to the n-gate node.

13. The active terminator of claim 12 wherein the first sensing transistor, the pullup clamp transistor, and the first limiting transistor are p-channel transistors;

wherein the second sensing transistor, the pulldown clamp transistor, and the second limiting transistor are n-channel transistors.

14. The active terminator of claim 13 wherein the first and second capacitors have sufficient capacitances to drive the p-gate node low by 2 volts and to drive the n-gate node high by 2 volts when the transmission line swings by 3.3 volts.

15. The active terminator of claim 14 wherein the transmission line is clamped to 0.5 volt above the power supply and 0.5 volt below ground by the first and second clamp transistors.

16. An actively-driven terminating circuit comprising:

first sensing transistor means, having a gate coupled to a transmission line input, for driving a back node with a first current when a first transition is detected on the transmission line input;

second sensing transistor means, having a gate coupled to the transmission line input, for driving the back node with a second current when a second transition is detected on the transmission line input;

first terminating transistor means, responsive to a first node, for driving a first terminating current to the transmission line input when the second transition is detected;

first capacitor means for coupling a portion of a voltage change on the back node caused by the second current to the first node;

first recovery means, coupled to the first node, for returning the first node to a first voltage after the first capacitor has coupled the portion of the voltage change to the first node;

second terminating transistor means, responsive to a second node, for driving a second terminating current to the transmission line input when the first transition is detected;

second capacitor means for coupling a portion of a voltage change on the back node caused by the first current to the second node; and second recovery means, coupled to the second node, for returning the second node to a second voltage after the second capacitor has coupled the portion of the voltage change to the second node, whereby the first terminating current is supplied to the transmission line input when the second transition is detected while the second terminating current is supplied when the first transition is detected.

17. The actively-driven terminating circuit of claim 16 further comprising:

first limit means, coupled to the first node, for limiting an unwanted voltage swing caused by the first current coupling a voltage through the first capacitor; and second limit means, coupled to the second node, for limiting an unwanted voltage swing caused by the second current coupling a voltage through the second capacitor, whereby unwanted voltage swings are limited.

18. The actively-driven terminating circuit of claim 17 wherein the first sensing transistor means, the first terminating transistor means, and the first limit means are p-channel transistors;

wherein the second sensing transistor means, the second terminating transistor means, and the second limit means are n-channel transistors.

19. The actively-driven terminating circuit of claim 18 wherein the first recovery means comprises a resistor between the first node and the first voltage;

wherein the second recovery means comprises a resistor between the second node and the second voltage.

20. The actively-driven terminating circuit of claim 19 wherein the first voltage is a power-supply voltage and the second voltage is a ground voltage.

* * * * *